(No Model.)

W. J. McCAUSLAND.
SPINDLE FOR CONICAL COP TUBES.

No. 515,301. Patented Feb. 20, 1894.

Witnesses:
R. Schleicher.
Murray C. Boyer

Inventor
William J. McCausland
by his Attorneys
Howson & Howson

UNITED STATES PATENT OFFICE.

WILLIAM J. McCAUSLAND, OF PHILADELPHIA, PENNSYLVANIA.

SPINDLE FOR CONICAL COP-TUBES.

SPECIFICATION forming part of Letters Patent No. 515,301, dated February 20, 1894.

Application filed June 8, 1893. Serial No. 476,976. (No model.)

*To all whom it may concern:*

Be it known that I, WILLIAM J. MCCAUSLAND, a citizen of the United States, residing in Philadelphia, Pennsylvania, have invented Improvements in Spindles for Conical Cop-Tubes, of which the following is a specification.

The object of my invention is to so construct a spindle for conical cop tubes that said tubes can be readily applied to or removed from the spindle, and when so applied, will be firmly held without risk of slipping and without any danger of being mutilated. This object I attain in the manner hereinafter set forth, reference being had to the accompanying drawings, in which—

Figure 1:
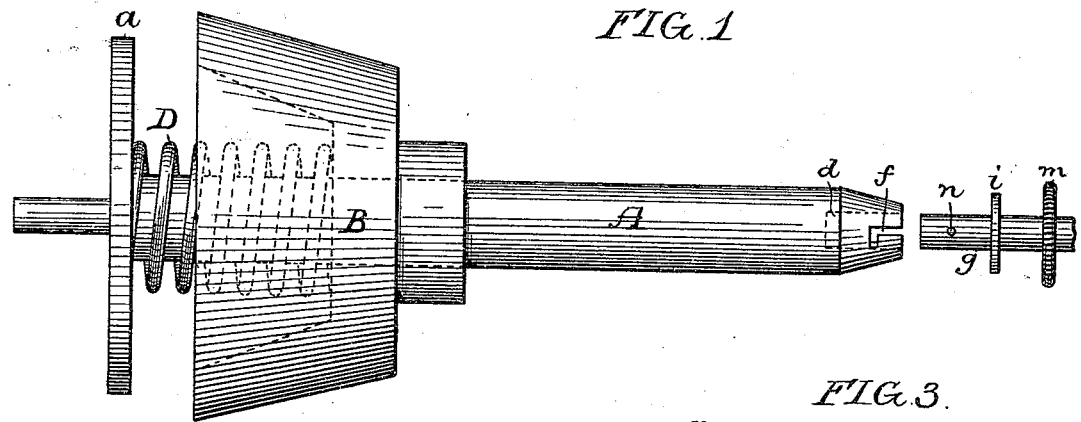
Figure 2:
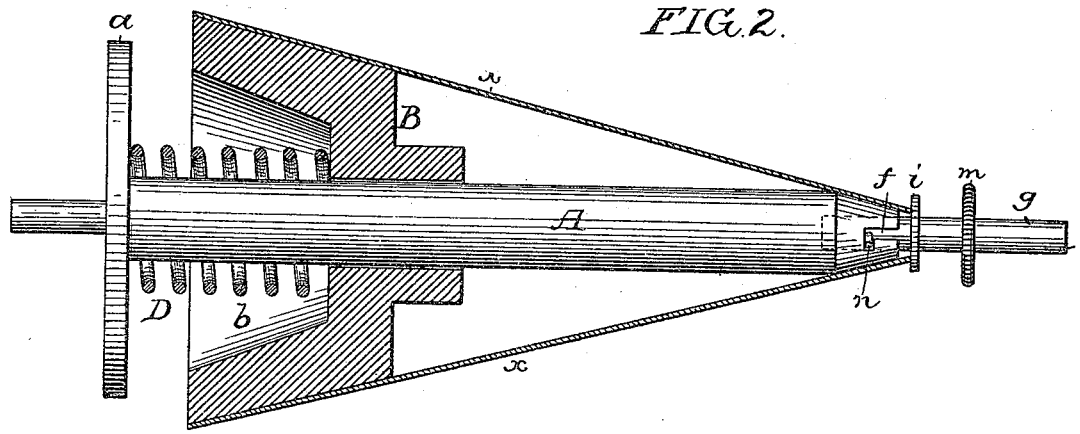

Figure 1, represents a side elevation of a cop spindle constructed in accordance with my invention, one of the retaining elements of the spindle being detached. Fig. 2, is a view partly in elevation and partly in section and showing a cop tube applied to the spindle; and Fig. 3, is a view illustrating a modified construction of part of the spindle.

A represents the central stem of the spindle, upon which is mounted, so as to be free to slide, a collar or sleeve B which is acted upon by a spring D, the latter bearing against a flange or collar $a$ on the spindle and entering a recess $b$ formed in the end of the sliding sleeve B. The sleeve B is coned or flared externally to accord with the taper of the cop tube $x$ and the end of the stem A of the spindle is likewise coned or flared and has formed in it a central opening or recess $d$ and at one side of the same an L-shaped slot $f$.

To the opening $d$ is adapted a stud $g$ which has a flange $i$, a milled head $m$ and a projecting pin $n$. When the stud $g$ is removed from the spindle the conical paper cop tube is slipped onto the same so as to fit upon the sleeve B and the stud $g$ is then applied to the opening $d$ in the upper end of the spindle and pushed inward until its pin $n$ can be turned into the transverse portion of the L-shaped slot $f$, this slot bearing such relation to the sleeve B and to the length of the tube $x$ that when the stud $g$ is thus pushed inward in order to permit the pin to enter the transverse portion of the slot, the flange $i$ on the stud will press upon the outer end of the cop tube and will force the same and the sleeve B forward on the spindle A against the action of the spring D until the outer end of the cop tube is seated upon the conical end of the spindle, the release of the tube being readily effected by removing the stud $g$, whereupon the spring D will move the sleeve B on the spindle and loosen the hold of the tube upon the outer end of said spindle so that the tube with its load of yarn can be readily removed. By this means the ready application or removal of the cop tube can be effected and the tube is retained in place by its frictional hold upon the end of the spindle and upon the sleeve B, no puncturing of the tube being required and no slipping of the tube on the spindle, or mutilation of the tube by reason of the holding devices, being possible, hence my invention overcomes a serious objection to that class of spindles for conical cop tubes in which the tube is held by means of projecting pins upon a spring arm carried by the spindle.

Figure 3:
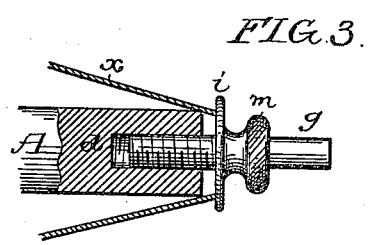

It will be evident that in carrying out my invention, a thread upon the stud $g$ and in the opening $d$, as shown for instance in Fig. 3, may be used in place of the slot and pin connection which I have shown, without departing from the essential feature of my invention. In some cases, the flaring of the upper end of the spindle A may be dispensed with, as also shown in said Fig. 3, the frictional hold of the cop tube upon the flaring sleeve B being sufficient to insure the rotation of said tube. A fixed sleeve B might also be employed in cases where all of the cop tubes are of the same length.

Having thus described my invention, I claim and desire to secure by Letters Patent—

1. The combination of the spindle having a sliding conical sleeve forming a seat for the enlarged end of the tube, a spring for acting on said sleeve so as to force it into the tube, and a detachable retainer attached to the spindle and bearing upon the contracted end of the cop tube so as to force the same onto the sliding sleeve, substantially as specified.

2. The combination of the spindle having a conical end, a sliding conical sleeve forming a seat for the enlarged end of the tube, a spring acting on said sleeve so as to force it into the tube, and a detachable retainer applied to the spindle and having, beyond the conical end of the same, a flange adapted to bear upon the contracted end of the cop tube and press the same into contact with said conical end and with the sliding conical sleeve, substantially as specified.

3. The combination of the spindle having an opening and L-shaped slot in the end, a sliding sleeve, and a spring acting thereon, with a retainer for the cop tube consisting of a stud adapted to the opening in the end of the spindle, and having a flange for bearing upon the end of the cop tube, and a projecting pin for engagement with the slot in the spindle, substantially as specified.

In testimony whereof I have signed my name to this specification in the presence of two subscribing witnesses.

WM. J. McCAUSLAND.

Witnesses:
FRANK E. BECHTOLD,
WILLIAM A. BARR.